(12) United States Patent
Bae

(10) Patent No.: US 7,310,804 B2
(45) Date of Patent: Dec. 18, 2007

(54) APPARATUS TO LOAD A DISC CARTRIDGE

(75) Inventor: Won-youl Bae, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 399 days.

(21) Appl. No.: 10/722,568

(22) Filed: Nov. 28, 2003

(65) Prior Publication Data

US 2005/0022216 A1 Jan. 27, 2005

(30) Foreign Application Priority Data

Jul. 22, 2003 (KR) ................. 10-2003-0050264

(51) Int. Cl.
*G11B 17/04* (2006.01)
(52) U.S. Cl. .............. 720/616; 720/610; 720/627
(58) Field of Classification Search ........... 720/616, 720/610, 627, 630, 631; 360/99.02, 99.03
See application file for complete search history.

(56) References Cited

U.S. PATENT DOCUMENTS

| | | | |
|---|---|---|---|
| 5,325,243 A | 6/1994 | Rath et al. | |
| 5,465,246 A * | 11/1995 | d'Alayer de Costemore d'Arc | 720/631 |
| 5,532,995 A * | 7/1996 | Choi | 720/633 |
| 5,577,014 A | 11/1996 | Kawamura | |
| 5,586,092 A | 12/1996 | Seo | |
| 5,612,940 A | 3/1997 | Otsuka et al. | |
| 5,615,197 A | 3/1997 | Choi | |
| 5,675,566 A | 10/1997 | Kosaka et al. | |
| 5,737,293 A * | 4/1998 | Kawamura et al. | 720/628 |
| 5,889,639 A | 3/1999 | Swanson et al. | |
| 5,933,400 A | 8/1999 | Kabasawa | |
| 6,181,664 B1 | 1/2001 | Kano et al. | |
| 6,259,667 B1 * | 7/2001 | Huang et al. | 720/616 |
| 6,262,959 B1 * | 7/2001 | Hashimoto | 720/632 |
| 6,504,809 B1 | 1/2003 | Takeda et al. | |
| 6,538,971 B2 | 3/2003 | Seo et al. | |
| 6,538,984 B2 | 3/2003 | Sanada et al. | |
| 6,954,937 B2 * | 10/2005 | Kim et al. | 720/616 |
| 2003/0103436 A1 | 6/2003 | Nakashima | |
| 2005/0020954 A1 * | 1/2005 | Katane et al. | 602/36 |
| 2005/0076349 A1 * | 4/2005 | Santo et al. | 720/616 |
| 2005/0204373 A1 * | 9/2005 | Ueno et al. | 720/616 |
| 2005/0229194 A1 * | 10/2005 | Kawaguchi et al. | 720/630 |

FOREIGN PATENT DOCUMENTS

JP 63-146268 6/1988

(Continued)

OTHER PUBLICATIONS

U.S. Appl. No. 10/722,564, filed Nov. 28, 2003, Kim.

*Primary Examiner*—Brian E. Miller
(74) *Attorney, Agent, or Firm*—Staas & Halsey LLP

(57) ABSTRACT

An apparatus to accommodate and load a disc cartridge in a drive includes a tray on which the disc cartridge is accommodated, a locking lever having a locking hook caught in a groove formed at a side wall of the disc cartridge when accommodated on the tray and which restricts/releases the disc cartridge using the locking hook. A sliding holder is slidably installed at the tray to prevent the disc cartridge from moving by pressing the disc cartridge restricted by the locking lever in one direction.

28 Claims, 6 Drawing Sheets

FOREIGN PATENT DOCUMENTS

| | | |
|---|---|---|
| JP | 407037313 | 2/1995 |
| JP | 11-149687 | 6/1999 |
| JP | 11-185346 | 7/1999 |
| JP | 11-242848 | 9/1999 |
| JP | 11-259949 | 9/1999 |
| JP | 2000-113553 | 4/2000 |
| JP | 2001-222872 | 8/2001 |
| JP | 2002-124002 | 4/2002 |

* cited by examiner

APPARATUS TO LOAD A DISC CARTRIDGE

CROSS-REFERENCE TO RELATED APPLICATION

This application claims the benefit of Korean Patent Application No. 2003-50264 filed on Jul. 22, 2003 in the Korean Intellectual Property Office, the disclosure of which is incorporated herein in its entirety by reference.

BACKGROUND OF THE INVENTION

1. Field of the Invention

The present invention relates to an apparatus to accommodate a disc cartridge and to load the disc cartridge in a drive, and more particularly, to a loading apparatus which can accommodate a bare disc as well.

2. Description of the Related Art

Recently, there has been an increase in the use of optical discs, such as Compact Discs (CDs), Digital Versatile Discs (DVDs), and Blue Ray Discs (BDs), as an information recording/reproducing media. In general, the optical disc is accommodated in a tray in form of a bare disc and loaded in a drive. The bare disc requires careful handling since a surface of the disc is exposed to the outside. Accordingly, disc cartridges which can prevent damage to the disc and facilitate handling of the disc have been suggested. However, research and development regarding a loading apparatus for accommodating the disc cartridge has not been actively performed.

Japanese Patent Publication No. 63-146268 discloses an example of the loading apparatus which can accommodate the disc cartridge. Also, Japanese Patent Publication No. 11-149687 and Japanese Patent Publication No. 2000-113553 disclose loading apparatuses which can accommodate both the disc cartridge and the bare disc. Nevertheless, actual use of the apparatuses is difficult due to the complicated structure thereof.

SUMMARY OF THE INVENTION

To solve the above and/or other problems, the present invention provides a loading apparatus which can stably accommodate a disc cartridge.

Furthermore, the present invention provides a loading apparatus which can stably accommodate both a disc cartridge and a bare disc.

Additional aspects and/or advantages of the invention will be set forth in part in the description which follows and, in part, will be obvious from the description, or may be learned by practice of the invention.

According to an aspect of the present invention, an apparatus for accommodating and loading a disc cartridge in a drive, the apparatus includes a tray on which the disc cartridge is accommodated; a locking lever having a locking hook caught in a groove formed at a side wall of the disc cartridge when accommodated on the tray and which restricts/releases the disc cartridge using the locking hook; and a sliding holder slidably installed at the tray to prevent the disc cartridge from moving by pressing the disc cartridge restricted by the locking lever in one direction.

According to an aspect of the invention, when the disc cartridge is loaded, the locking lever is restricted by the sliding holder.

According to an aspect of the invention, the locking lever has one end on which the locking hook is formed and another end having a support portion and which is rotatably installed on the tray, where the support portion is restricted by the sliding holder when the disc cartridge is loaded.

According to an aspect of the invention, an accommodation portion to accommodate a bare disc is formed on an upper surface of the tray and a protrusion to prevent the bare disc from escaping from a set position is installed around the accommodation portion, the protrusion being elastically installed so as to retract into the tray.

According to an aspect of the invention, the apparatus is used in a tray having an open front surface portion.

According to an aspect of the invention, the disc includes a reproduction disc and a recordable disc such as CD-R/RW, a DVD-R/RW, a DVD-RAM, and a next generation DVD such as Blu-ray discs or Advanced Optical Discs.

According to an aspect of the invention, the disc includes an optical or a non-optical type.

BRIEF DESCRIPTION OF THE DRAWINGS

These and/or other features and advantages of the present invention will become apparent and more readily appreciated by describing in detail embodiments thereof with reference to the accompanying drawings in which.

DETAILED DESCRIPTION OF THE EMBODIMENTS

Figure 1:
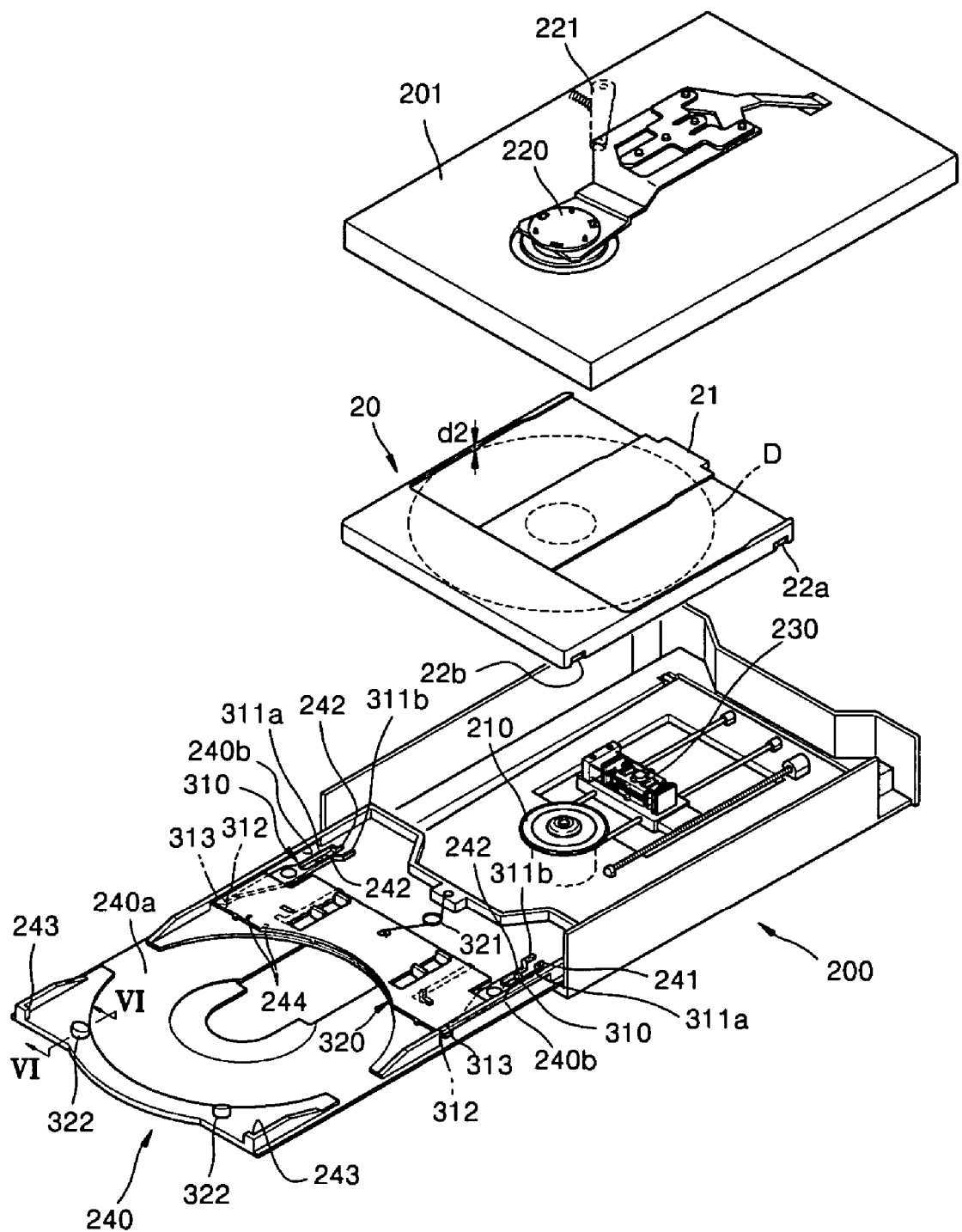
FIG. 1 is an exploded perspective view illustrating a disc drive using a loading apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIG. 1, a disc drive adopting a loading apparatus according to an embodiment of the present invention includes a main body 200 having a turntable on which a disc D is accommodated and an optical pickup 230 that records and/or reproduces with respect to the disc D. A tray 240 accommodates the disc D or a cartridge 20 containing the disc D and slides in and out of the main body 200. A cover 201 covers the main body 200. The cover further includes an opening lever 221 opens and shuts a shutter 21 of the cartridge 20, and a damper 220 that clamps the disc D onto the turntable 210.

The tray 240 includes a cartridge holding unit that fixes the cartridge 20 containing the disc D and a bare disc holding unit that fixes a bare disc D having no cartridge. The cartridge holding unit includes a pair of locking levers 310 elastically and rotatably installed on the tray 240 and a sliding holder 320 slidably installed on the tray 240. A first spring 321 elastically biases the sliding holder 320 toward a front surface of the tray 240.

Support portions 311 a and 311 b are formed at one end of the locking lever 310. The support portions 311$a$ and 311$b$ are restricted by predetermined stopping protrusions 241 and deformed to be elastically restored according to a rotation of the locking lever 310. A locking hook 312 fixes the cartridge 20 by being caught in a front groove 22a of grooves 22a and 22b formed at the side surface of the cartridge 20. The locking hook 312 is formed at the other end of the locking lever 310. The height of the locking hook 312 relative to the tray 240 is shorter than the thickness of the disc cartridge 20 when accommodated on the tray 240 according to an aspect of the invention. The locking hook 312 is installed to closely contact a surface of the tray 240 on which the cartridge 20 is accommodated.

Figure 2A:
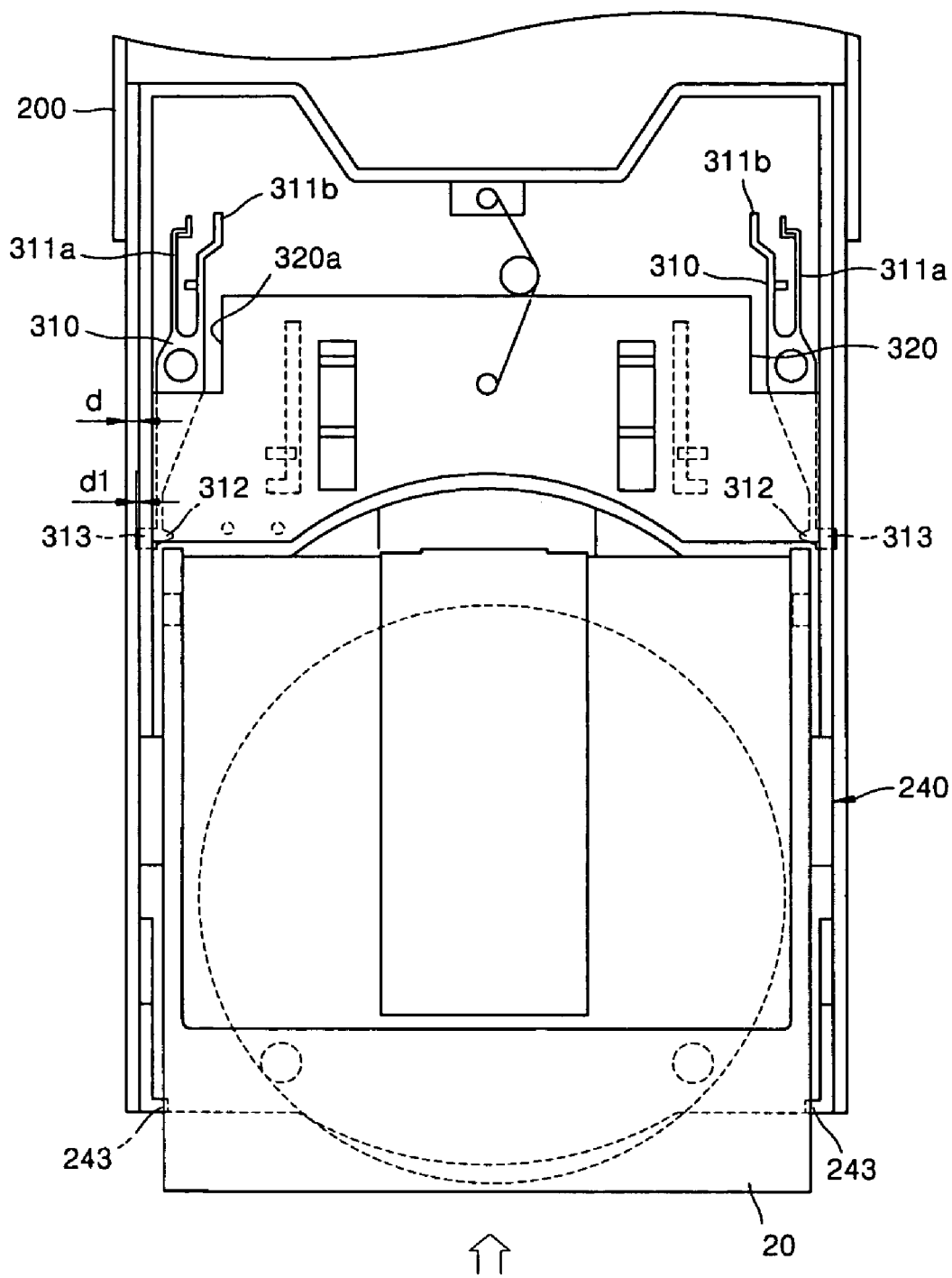
FIGS. 2A through 2C are views illustrating the disc cartridge being accommodated in a tray shown in FIG. 1.
Figure 2B:
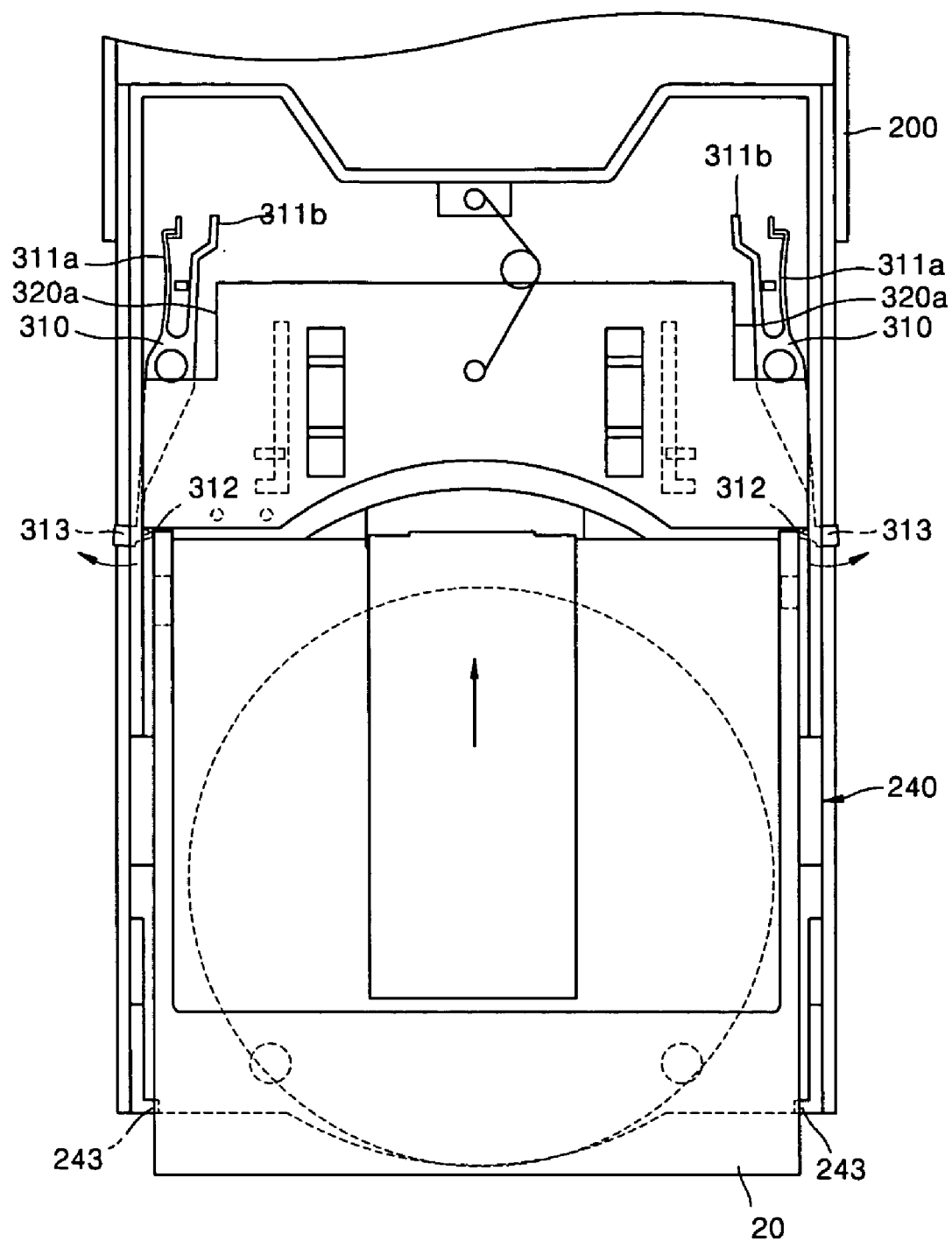
Figure 2C:
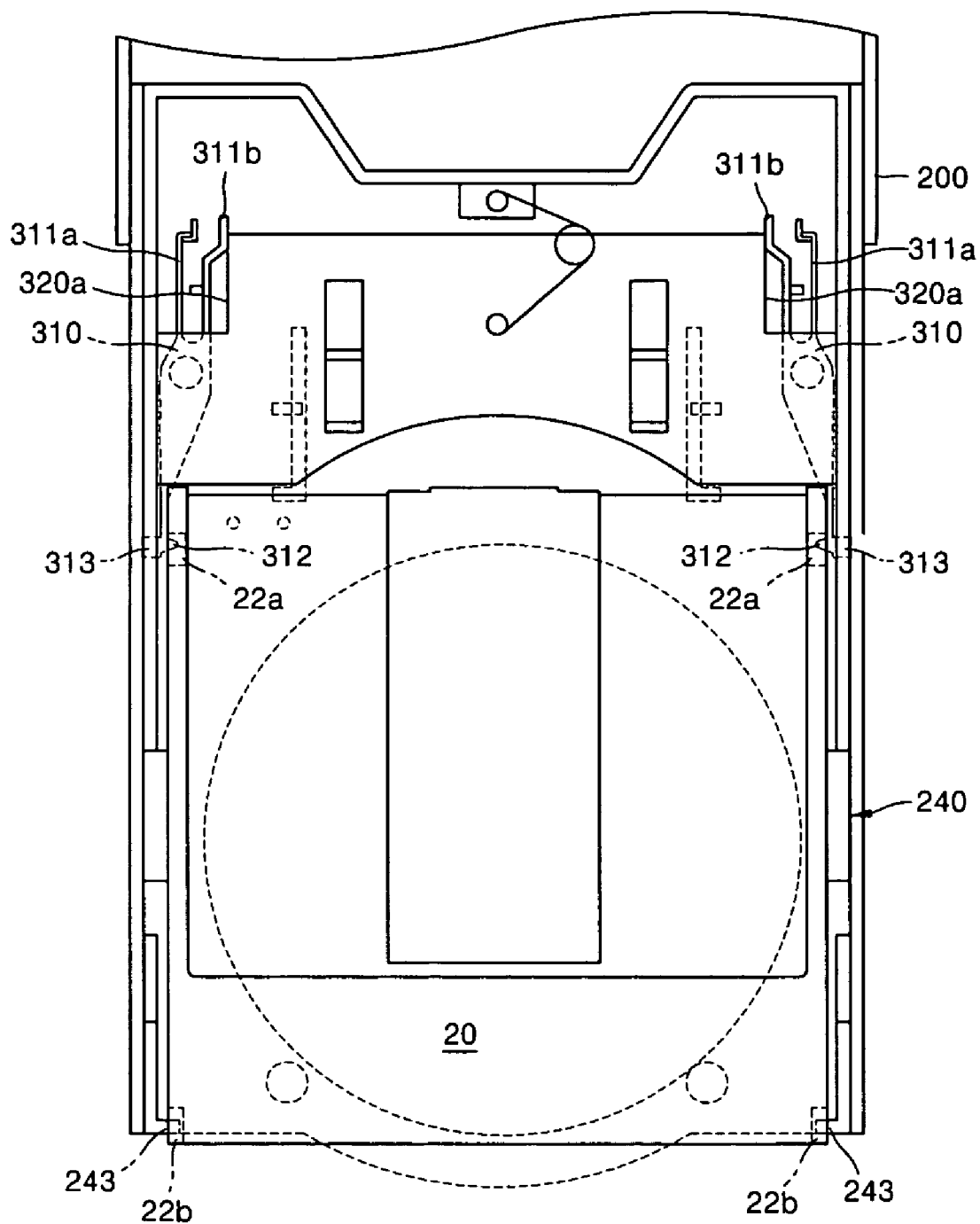

When the cartridge 20 is pushed from the front side of the tray 240, as shown in FIG. 2A, the locking hook 312 of the locking lever 310 bumps against the leading end of the cartridge 20. Then, as the cartridge 20 proceeds further, the first support portion 311a of the support portion 311a and 311b is greatly bent and the locking lever 310 rotates in a direction in which the locking hook 312 moves outward, as shown in FIG. 2B. When the cartridge 20 has been accommodated at an accommodating position of the tray 240 as shown in FIG. 2C, the locking lever 310 returns to the original position by a restoring force of the first support portion 311a and the locking hook 312 is caught in the groove 22a. Then, a hooking protrusion 243 provided on the tray 240 is caught in the rear groove 22b. As such, the cartridge 20 is fixed in the tray 240. It is understood that the hooking protrusion 243 need not be used in all aspects of the invention, and that, where additional support of the cartridge 20 is desired instead of or in addition to that provided by the locking hook 312 as shown in FIG. 2C, other mechanisms can be used to support a rear side of the disc cartridge 20 instead of or in addition to the groove 22b and protrusion 243 combination set forth in the shown embodiment. Additionally, it is understood that the location of the groove 22b can be disposed other than at the rear of the cartridge 20 and/or other than on a same side as the grove 22a.

Also, when the cartridge 20 is in a fixed state, the sliding holder 320 further supports the cartridge 20 to not be moved by pressing the cartridge 20 toward the front side of the tray 240 (i.e., biased against the hooking protrusion 243 and/or the locking hook 312 as shown in FIG. 2C). Simultaneously, a side wall portion 320a of the sliding holder 320 blocks the second support portion 311b to prevent the locking lever 310 from rotating. Accordingly, the cartridge 20 is stably and fixedly supported on the tray 240. When the cartridge 20 is to be ejected, after the hooking protrusion 243 is drawn back from the groove 22b, the cartridge 20 is pulled back with a force greater than the elasticity of the locking lever 310 supporting the locking hook 312.

The locking lever 310 further comprises an interference protrusion 313. The interference protrusion 313 is an element used in a reverse insertion prevention unit, which will be described later. According to an aspect of the invention, when the tray 240 is inserted in the main body 200, the interference protrusion 313 is restricted by a side wall of the main body 200 to prevent the locking hook 312 from being unlocked during recording and/or reproduction. It is understood that the interference protrusion 313 can be used to prevent unlocking of the locking hook 312 instead of or in addition to the second support portion 311b, which prevents the locking lever 310 from rotating to unlock the locking hook 312.

Next, the bare disc holding unit includes the sliding holder 320 slidably installed at the tray 240, and the first spring 321 elastically biasing the sliding holder 320 toward the front side of the tray 240 (i.e., in a direction opposite to the direction in which the cartridge 20 enters). The bare disc holding unit further includes a pair of protrusions 322 supporting the disc D from the opposite side to the sliding holder 320, to protrude from the tray 240 by an elastic force of a second spring 323 shown in FIG. 3. That is, the sliding holder 320 is used for both the cartridge holding unit and the bare disc holding unit. When the cartridge 20 is loaded, the sliding holder 320 is pushed inwardly by the cartridge 20. Then, when the cartridge 20 is ejected, the sliding holder 320 returns to a position near the accommodation portion 240a by being restored by the first spring 321. The protrusions 322 are pushed down under the tray 240 by being pressed by the cartridge 20 as shown in FIG. 2A and then protrudes back above the tray 240 by being restored by the second spring 323 after the cartridge 20 is ejected as shown in FIG. 1. That is, when the cartridge 20 is accommodated on the tray 240, both the sliding holder 320 and the protrusions 322 are moved back from the original positions to be disposed not to interfere with the tray 240.

Figure 5:
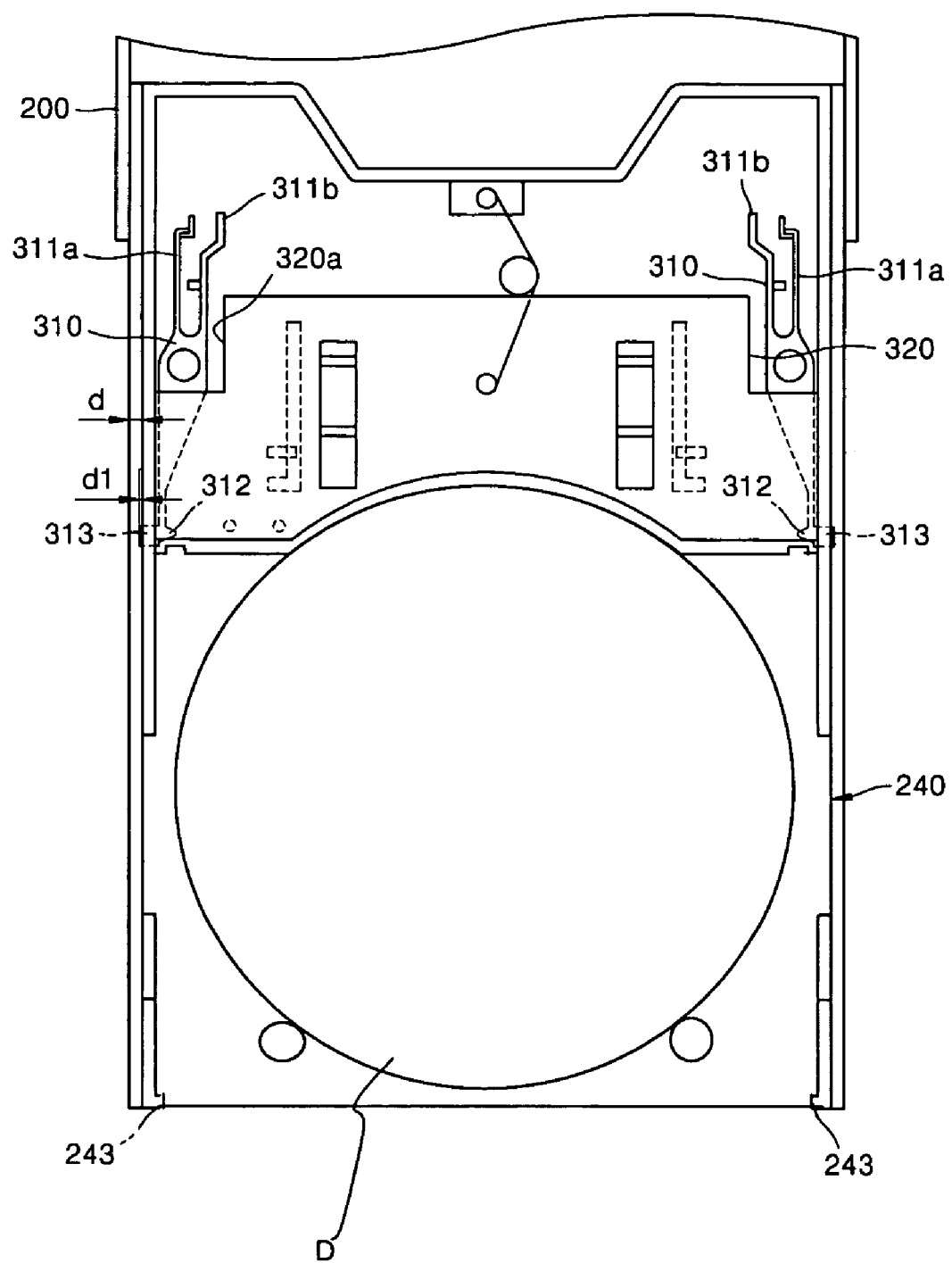
FIG. 5 shows the disc drive of FIG. 1 holding a bare disc.

When the disc D is accommodated, the sliding holder 320 and the protrusions 322 are disposed near the accommodation portion 240a to support an edge portion of the disc D to not escape from the accommodation portion 240a as shown in FIG. 5. Thus, when the disc D is accommodated on the accommodation portion 240a, the sliding holder 320 prevents the disc D from escaping toward the inside of the main body 200 and the protrusions 322 prevents the disc D from escaping in the opposite direction.

Figure 3:
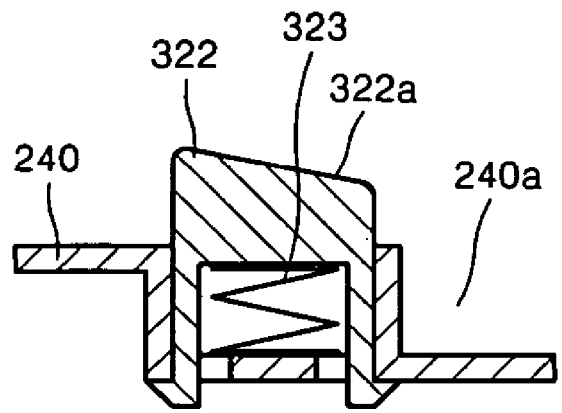
FIG. 3 is a sectional view taken along line VI-VI of FIG. 1.

According to an aspect of the invention, an inclined surface 322a inclined toward the accommodation portion 240a is formed on the protrusions 322 as shown in FIG. 3. Thus, when the disc D is placed on the protrusions 322, the disc D is smoothly moved along the inclined surface 322a into the accommodation portion 240a shown in FIG. 5.

Therefore, when the cartridge 20 is accommodated, the cartridge holding unit including the sliding holder 320 and the locking lever 310 firmly supports the cartridge 20. Also, when the disc D is accommodated, the bare disc holding unit including the sliding holder 320 and the protrusions 322 firmly supports the disc D.

Next, a unit to prevent reverse insertion of the disc cartridge 20 is provided on the tray 240 of an aspect of the present invention. The upper and lower surface reverse insertion prevention unit includes the interference protrusion 313 of the locking lever 310. The interference protrusion 313 protrudes outward through a window 240b formed in the side wall of the tray 240 by a distance d1. However, as shown in FIG. 2A, since the distance d1 is shorter than a distance d between the side wall of the tray 240 and the side wall of the main body 200, on condition that an external force is not applied, the interference protrusion 313 does not interfere with the side wall of the main body 200 when the tray 240 slides in and out of the main body 200. Also, when the cartridge 20 enters, as shown in FIG. 2B, the locking hook 312 contacts the leading end of the cartridge 20 and is deformed outwardly so that the interference protrusion 313 protrudes further outward than the distance d. When the cartridge 20 enters correctly as shown in FIG. 2C, the locking hook 312 is restored as being caught in the groove 22a and thus the interference protrusion 313 is returned to its original position where the interference protrusion 313 does not interfere with the side wall of the main body 200 while allowing the locking hook 312 to secure the cartridge 20 to prevent removal while the tray 240 is in the main body 200 during reproduction and/or reproduction. In the shown embodiment, the height of the locking hook 312 and the interference protrusion 313 relative to the tray 240 is shorter than the thickness of the disc cartridge 20 when accommodated on the tray 240 so such that the interference protrusion 313 and the locking hook 312 can be received at the corresponding window 240b and groove 22a according to an aspect of the invention. However, where the window 240b and/or the groove 22a are otherwise located or shaped, it is understood that the height of the locking hook 312 and/or the interference protrusion 313 relative to the tray 240 is adjusted accordingly.

Figure 4:
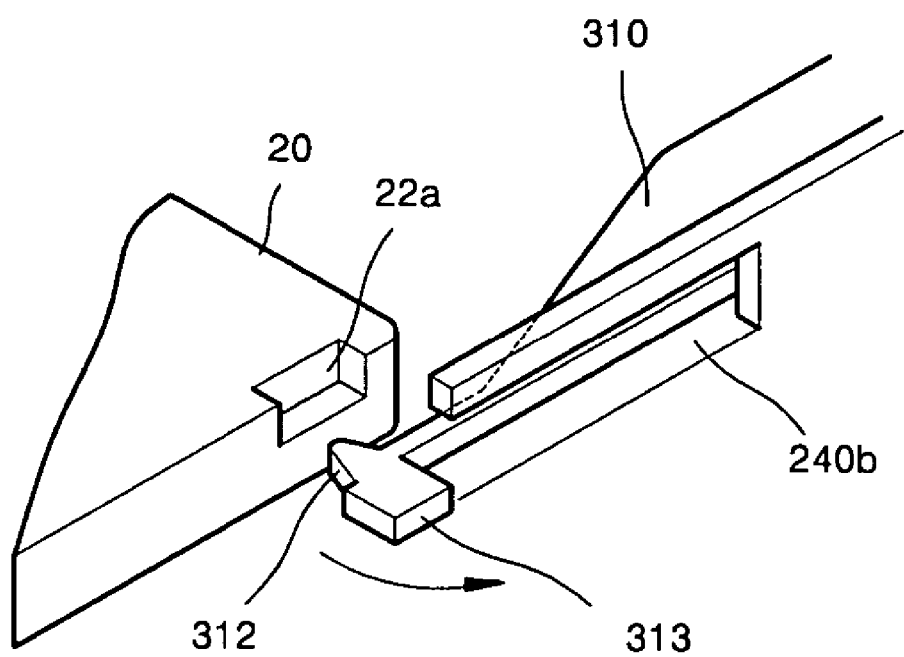
FIG. 4 is a perspective view illustrating a holding state when the disc cartridge is inserted with its upper and lower surfaces reversed.

However, when the cartridge 20 enters reversely (i.e., with the upper and lower surfaces upside down), the locking hook 312, which is deformed outwardly as the cartridge 20 enters, does not meet the groove 22a as shown in FIG. 4. Thus, the interference protrusion 313 is maintained in a state of protruding outwardly. In this state, if the tray 240 is pushed into the main body 200, the interference protrusion 313 bumps against the side wall of the main body 200 so that entry of the tray 240 is prevented. Thus, when the upper and lower surfaces of the cartridge 20 are reversed, the tray 240 is prevented from entering the main body 200 by the interference protrusion 313.

While described in terms of a tray, it is understood that the present invention can be utilized with a caddy that is removable from the main body 200. Further it is understood that the drive could include a blocking element such that, when the interference protrusion 313 is in the state shown in FIG. 4, the blocking elements prevents insertion into the main body 200 instead of or in addition to a side of the main body. Moreover, while described in terms of a locking hook 312 disposed on a locking lever 310 interacting with a groove 22a of the cartridge 20, it is understood that the locking lever 310 could include the groove 22a and the cartridge 20 could include the locking hook 312, and that other mechanisms could be used which receive each other with sufficient counterforce to overcome a bias force provided by the sliding holder 320. Further, it is understood that the groove 22a could be disposed at a lower portion instead of or in addition to the upper portion as shown in FIG. 4, and that the groove 22a could extend through the thickness of the cartridge 20.

As described above, the loading apparatus according to the present invention provides at least the following advantages. Since the disc cartridge holding unit and the bare disc holding unit are provided, either the cartridge or the bare disc can be stably and firmly held on the tray. Also, since the cartridge or the bare disc can be fixedly held on the tray without the front side wall of the tray, the tray can be designed more freely. Additionally, since the cartridge upper and lower surfaces reverse insertion prevention unit is provided, the cartridge can always enter in a correct manner so that a damage to the apparatus due to mishandling can be prevented.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to accommodate and load a disc cartridge housing a disc and which is loaded in a drive in a direction in which the disc cartridge enters, the apparatus comprising:
   a tray on which the disc cartridge is accommodated;
   a locking lever having a locking hook disposed to be caught in a groove formed at a side wall of the disc cartridge when accommodated on the tray and which restricts and/or releases the disc cartridge by using the locking hook; and
   a sliding holder installed on the tray to prevent the disc cartridge from moving by pressing the disc cartridge, restricted by the locking lever, in a direction opposite to the direction in which the disc cartridge enters.

2. The apparatus as claimed in claim 1, wherein, when the disc cartridge is loaded, the locking lever is restricted by the sliding holder.

3. The apparatus as claimed in claim 1, wherein a height of the locking hook is less than a thickness of the disc cartridge, and the locking hook is installed to closely contact a surface of the tray.

4. The apparatus as claimed in claim 1, wherein:
   the tray further comprises hooking protrusions disposed at corresponding side ends of a front surface portion of the tray opposite to a rear surface at which is disposed the sliding holder, and
   the hooking protrusions are inserted in corresponding grooves formed at corresponding side surfaces of a rear end portion of the disc cartridge opposite to a front end portion of the disc cartridge which is pressed by the sliding holder.

5. The apparatus of claim 1, further comprising an optical pickup transferring data with respect to the disc and a turn table which turns the disc.

6. An apparatus to accommodate and load a disc cartridge housing a disc and which is loaded in a drive in a first direction, the apparatus comprising:
   a tray on which the disc cartridge is accommodated;
   a locking lever having a locking hook disposed to be caught in a groove formed at a side wall of the disc cartridge when accommodated on the tray and which restricts and/or releases the disc cartridge by using the locking hook; and
   a sliding holder installed on the tray to prevent the disc cartridge from moving by pressing the disc cartridge, restricted by the locking lever, in a direction opposite the first direction,
   wherein:
      the locking lever has first and second ends and is installed on the tray,
      the first end comprises the locking hook, and
      the second end comprises a support portion that contacts the sliding holder to restrict a movement of the locking lever when the disc cartridge is loaded.

7. The apparatus as claimed in claim 6, further comprising a main body which receives the tray, wherein:
   the locking lever further comprises an interference protrusion formed at a side of the locking lever opposite to a side having the locking hook, and
   when the tray containing the disc cartridge is inserted into the main body, the interference protrusion is restricted by a side wall of the main body to prevent the locking hook from being unlocked.

8. The apparatus as claimed in claim 7, wherein:
   the interference protrusion protrudes outwardly from the locking lever by a distance from a side surface of the tray, and
   the distance is less than a distance between the side wall of the main body and the side surface of the tray, and
   when the locking hook contacts the side wall of the disc cartridge and is not caught in the groove of the disc cartridge, the interference protrusion protrudes past the side wall of the main body so as to contact the side wall of the main body during insertion so as to prevent insertion of the tray into the main body.

9. The apparatus as claimed in claim 8, wherein the support portion comprises:
   a first support portion extending with a relatively small thickness and having an end portion fixed to the tray to provide elasticity to the locking lever, and
   a second support portion extending with a relatively large thickness and is contacted by the sliding holder when the disc cartridge is loaded to prevent the locking lever from moving.

10. An apparatus to accommodate and load a disc cartridge housing a disc and which is loaded in a drive in a first direction, the apparatus comprising:
   a tray on which the disc cartridge is accommodated;
   a locking lever having a locking hook disposed to be caught in a groove formed at a side wall of the disc cartridge when accommodated on the tray and which restricts and/or releases the disc cartridge by using the locking hook; and
   a sliding holder installed on the tray to prevent the disc cartridge from moving by pressing the disc cartridge, restricted by the locking lever, in a direction opposite the first direction,
   wherein the tray further comprises:
      an accommodation portion disposed on an upper surface of the tray and which accommodates a bare disc that is not disposed in the disc cartridge, and
      a protrusion to prevent the bare disc from escaping from a set position and which is installed around the accommodation portion, the protrusion being capable of elastically retreating so as to protrude when the bare disc is received but to retreat when the disc cartridge is received.

11. The apparatus as claimed in claim 10, wherein the sliding holder is installed to prevent the bare disc from escaping toward an inside of the tray and the protrusion is installed at a side of the tray opposite to the side at which the sliding holder is installed.

12. A housing to accommodate and load a disc cartridge which holds an optical disc, the housing comprising:
   a case;
   a tray on which the disc cartridge is accommodated and which is received in the case in a direction in which the disc cartridge enters;
   a locking lever having a locking element which is received in a corresponding receiving element of the disc cartridge when accommodated on the tray; and
   a holder slidably installed on the tray and which biases the disc cartridge against the locking element in a direction opposite to the direction in which the disc cartridge enters so as to prevent movement of the disc cartridge relative to the tray when the disc cartridge is accommodated on the tray.

13. The housing of claim 12, wherein the locking element engages with the receiving element when the disc cartridge is disposed in a first position on the tray, and does not engage the locking element with the receiving element when the disc cartridge is not disposed in the first position.

14. The housing of claim 13, wherein the holder biases against the disc cartridge such that the disc cartridge will not remain in the first position unless the receiving element is engaged with the locking element.

15. The housing of claim 13, wherein the locking lever rotates relative to the tray such that, when in the first position, the locking element is rotated to engage the receiving element, and when not in the first position, the locking element is rotated away from the disc cartridge.

16. The housing of claim 13, wherein:
   the locking lever rotates in order for the locking element to be received at the corresponding receiving element of the disc cartridge; and
   a holding element comprises an extended portion that, when in the first position, contacts a portion of the locking lever to prevent the locking lever from rotating to remove the locking element from the corresponding receiving element of the disc cartridge.

17. The housing of claim 16, wherein the holder is biased to press against the disc cartridge in a first direction and, when the locking element is received at the receiving element, the locking element provides a counter force sufficient to prevent movement in the first direction.

18. The housing of claim 12, wherein the locking lever rotates relative to the tray such that, when in a first position, the locking element is rotated to engage the receiving element, and when not in the first position, the locking element is rotated away from the disc cartridge.

19. The housing of claim 18, wherein the receiving element is disposed on a first side of the disc cartridge, and the holder biases against a second side of the disc cartridge adjacent the first side.

20. The housing of claim 12, wherein the tray further comprises a disc holding element that holds another optical disc when accommodated on the tray, and the another optical disc is accommodated on the tray without the disc cartridge.

21. The housing of claim 12, wherein the holder further comprises a surface having a curvature to follow a corresponding edge of the another optical disc when accommodated on the tray.

22. The housing of claim 12, wherein the disc holding element further comprises retractable protrusions that guide the another optical disc to be accommodated on the tray, and the retractable protrusions retract when the disc cartridge is accommodated on the tray.

23. The housing of claim 22, wherein the retractable protrusions have corresponding inwardly inclined surfaces that guide the another optical disc to be accommodated on the tray.

24. The housing of claim 12, further comprising an optical pickup transferring data with respect to the optical disc and a turn table which turns the optical disc.

25. A housing to accommodate and load a disc cartridge which holds an optical disc, the housing comprising:
   a case;
   a tray on which the disc cartridge is accommodated and which is received in the case in a first direction;
   a locking lever having a locking element which is received in a corresponding receiving element of the disc cartridge when accommodated on the tray; and
   a holder slidably installed on the tray and which biases the disc cartridge against the locking element in a direction opposite the first direction so as to prevent movement of the disc cartridge relative to the tray when the disc cartridge is accommodated on the tray,
   wherein the locking lever moves in order for the locking element to be received at the corresponding receiving element of the disc cartridge, and the tray further comprises a non-moveable locking element that receives a corresponding other receiving element of the disc cartridge when the locking element is received at the corresponding receiving element.

26. A housing to accommodate and load a disc cartridge which holds an optical disc, the housing comprising:
   a case;
   a tray on which the disc cartridge is accommodated and which is received in the case in a first direction;

a locking lever having a locking element which is received in a corresponding receiving element of the disc cartridge when accommodated on the tray; and a holder slidably installed on the tray and which biases the disc cartridge against the locking element in a direction opposite the first direction so as to prevent movement of the disc cartridge relative to the tray when the disc cartridge is accommodated on the tray, wherein the tray is slidably accommodated in the case, and wherein the locking lever further comprises a reversal prevention unit that prevents the tray from sliding into the case when the disc cartridge is accommodated in the tray but where the locking element is not received in the receiving element of the disc cartridge.

27. The housing of claim 26, wherein:

the locking element is disposed at a first height above a surface of the tray which corresponds to a height of the receiving element when the disc cartridge is accommodated on the tray with a first orientation, the reversal prevention unit is disposed to allow the tray to slide into the case when the disc cartridge is accommodated in the tray at the first orientation at which the locking element is received in the receiving element, and the reversal prevention unit prevents the tray from sliding into the case when the disc cartridge is accommodated in the tray in a second orientation other than the first orientation and the receiving element is disposed at a second height above the surface of the tray other than the first height so as to prevent the locking element from being received at the receiving element.

28. The housing of claim 25, wherein the reversal prevention unit comprises a protrusion that, when the disc cartridge is received in the tray and the locking element is received in the receiving element, does not contact the case and supports the locking element to remain at the receiving element, and when the disc cartridge is received in the tray and the locking element is not received in the receiving element, contacts the case to prevent the tray from sliding into the case.

* * * * *

UNITED STATES PATENT AND TRADEMARK OFFICE
CERTIFICATE OF CORRECTION

| | |
|---|---|
| PATENT NO. | : 7,310,804 B2 |
| APPLICATION NO. | : 10/722568 |
| DATED | : December 18, 2007 |
| INVENTOR(S) | : Won-youl Bae |

Page 1 of 1

It is certified that error appears in the above-identified patent and that said Letters Patent is hereby corrected as shown below:

Column 10, Line 11, Claim 28, change "claim 25," to --claim 26,--.

Signed and Sealed this

Third Day of June, 2008

JON W. DUDAS
*Director of the United States Patent and Trademark Office*